March 3, 1931. T. T. GREENWOOD 1,794,683
ELECTRICAL DISTRIBUTION SYSTEM AND SECTIONALIZING SWITCH THEREFOR
Filed May 31, 1929

Inventor,
Telma T. Greenwood

Patented Mar. 3, 1931

1,794,683

UNITED STATES PATENT OFFICE

TALMA T. GREENWOOD, OF EAST TEMPLETON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRICAL DISTRIBUTION SYSTEM AND SECTIONALIZING SWITCH THEREFOR

Application filed May 31, 1929. Serial No. 367,444.

This invention relates to systems of electrical distribution and especially to distribution feeders, as ring feeders, which have the load distributed along the feeder and which are divided into a plurality of sections with automatic reclosing switches controlling the connections between the sections.

If a fault occurs in a section of the feeder, it is desirable to isolate that section from the other sections of the system and maintain as many as possible of the remaining sections energized. When it is possible to energize the feeder from several points, as, for example, from both ends, as in a ring feeder, the faulty section can be isolated without discontinuing the service on the remaining sections.

It is an object of this invention to provide a sectionalizing switch for connecting together two adjacent feeder sections having means responsive to a fault in either section to open the switch and maintain the section disconnected for so long as the fault exists and thereby to keep the faulty section isolated from the system.

A further object of the invention is the provision of an automatically reclosing switch having means responsive to the condition of the adjacent feeder sections which it connects whereby to govern the reclosing of the switch.

A further object of the invention is the provision of a reclosing switch having inductive means associated with adjacent feeder sections arranged to control the closing of the switch when it is open while maintaining the sections electrically isolated.

A yet further object of the invention is the provision of a sectionalizing switch including windings separately energized from said sections and inductively related with each other, and switch closing means responsive to current conditions in said windings to close the switch only when either or both of said windings are normally energized and no fault exists on either section.

A further object is generally to improve the construction and operation of electric distribution systems and sectionalizing switches therefor.

Figure 1:
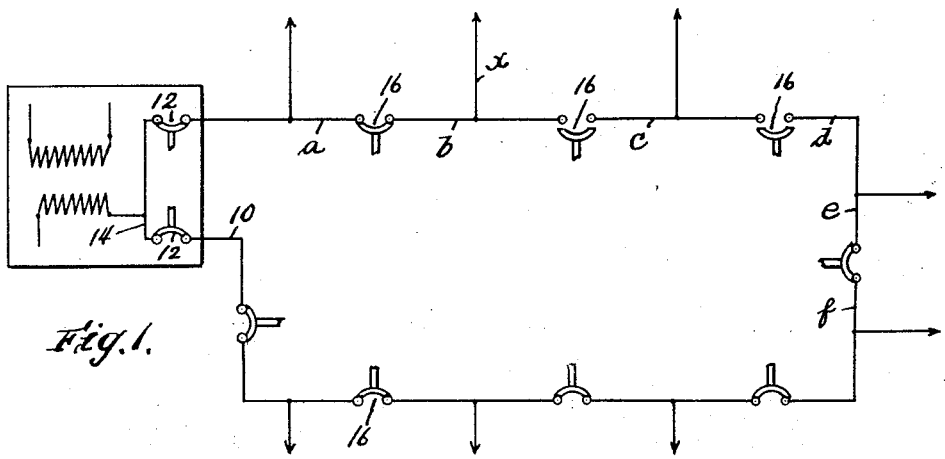
Fig. 1 is a diagrammatic representation of a single line, or phase, of a multi-phase sectionalized distribution system with which this invention is associated.

Fig. 1 illustrates one phase, or line, of a sectionalized distribution system wherein the line conductor 10 is extended in a loop or ring throughout the district served by the system and the terminals of the loop are connected at the substation through overload-responsive circuit-interrupters 12 with a common bus 14. The conductor comprises a plurality of electrically separate sections $a$, $b$, $c$, $d$, $e$, $f$, etc., and the sections are adapted normally to be connected in series by automatically reclosing sectionalizing switches 16. The switches 16 are adapted to open upon reduction of voltage in the feeder line 10 but are not responsive to overload conditions of the line. The circuit breakers 12, however, are provided with overload responsive means and upon occurrence of a fault at any point on the system both breakers 12 are adapted to open. The automatic opening of all of the sectionalizing breakers 16 follows as a natural consequence due to the failure of potential on the line. By these provisions the sectionalizing breakers 16 can be of moderate capacity since they are never called upon to interrupt the overload current in the system, but serve merely to open the circuit under reduced voltage, as after the breakers 12 have opened the system, and to close the circuit only when conditions on the circuit are normal.

The operation of such a system may be substantially as follows:

If a fault, as a short circuit, develops in section $c$, for instance, thereby producing an overload current in that section and consequently in the whole line, both circuit interrupters 12 at the station will open and thereby isolate the entire line from the bus 14. As the line 10 is now without potential, all the sectionalizing switches 16 will open. Preferably, some retarding means is associated with the under voltage mechanism of the section switches 16 whereby to delay the opening thereof until the interrupters 12 have completely interrupted the current in the line.

As soon as the switches 16 have opened, the circuit interrupters 12 are adapted to be closed by any suitable means, as an automatic reclosing device, thereby placing potential on the first sections adjacent the station. As soon as potential is established on the first sections, the first section switches are automatically closed by their reclosing mechanisms, thereby placing potential upon the second sections. The second section switches now close, and potential is established on the next sections, and so on through the system to the faulty section.

In accordance with the present invention, the section switches 16 are provided with means to maintain them open for so long as a fault exists on either of the sections associated with them. If the fault has disappeared, the sections will all be reconnected through the switches 16; but if the fault still exists, the switches at the ends of the faulty section will not be reclosed and that section will remain isolated from the system, the remaining sections being energized from bus 14 as two separate conductors.

If, while the faulty section is thus isolated from the system, the fault is removed therefrom, means are provided to immediately energize the closing mechanisms of the two switches of the section, whereby to close them and energize the isolated section.

Figure 2:
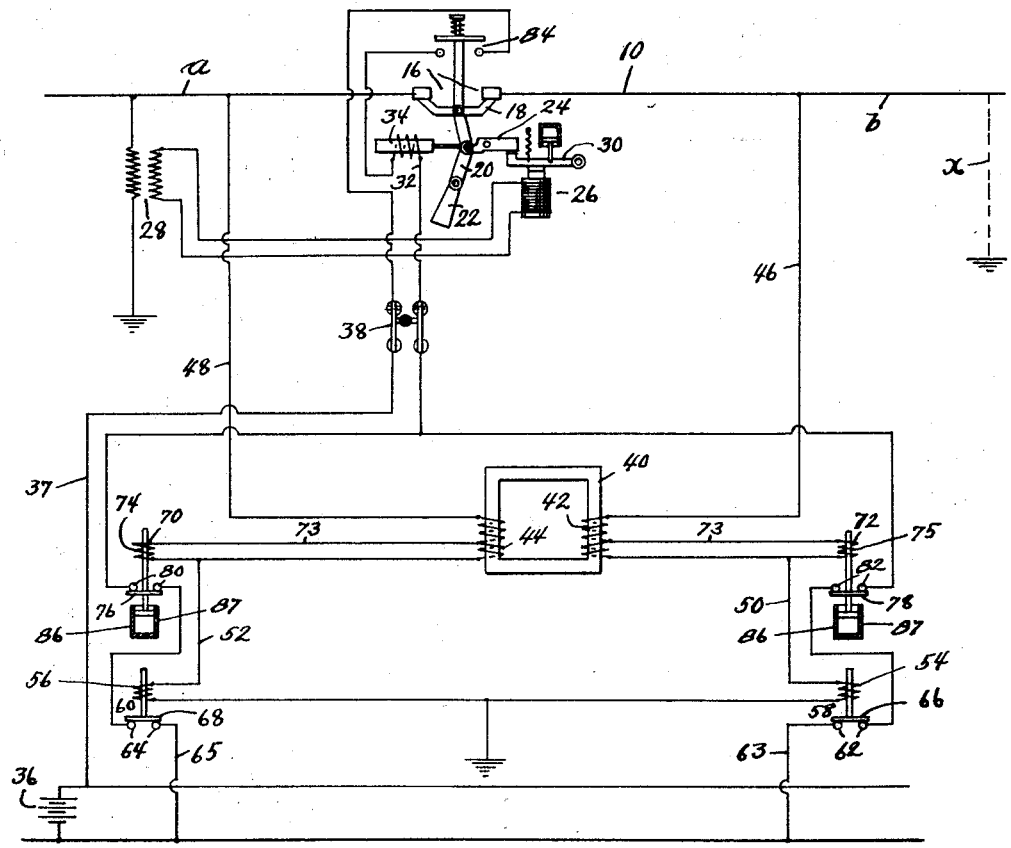
Fig. 2 is a diagrammatic representation of a reclosing sectionalizing switch embodying the invention.

As shown diagrammatically in Fig. 2, each section switch 16 includes a movable bridging member 18 which is adapted to complete the circuit between the adjacent sections, as sections a, b, controlled by the switch. An operating toggle 20 is provided having an operating handle 22 by which the switch can be opened and closed manually. An abutment 24 is adapted to arrest the toggle 20 in a slightly undershot position in the switch closed positions thereof, and an undervoltage mechanism 26 normally energized from a potential transformer 28 in the line 10 is adapted by means of a spring-biased arm 30 thereof to engage said abutment and trip the switch upon a failure, or a material reduction, of voltage in the line. Said arm is preferably provided with a dashpot or similar device to produce a slight time delay in the upward or tripping movement only of the tripping arm to give the circuit interrupters 12 time to operate and thus to preclude the possibility of an arc being drawn at the contact members of the section switch.

Any suitable means may be provided for automatically reclosing the section switch when the conditions in the adjacent feeder sections are normal. In Fig. 2 the closing means is represented by a solenoid 34 which is operatively connected with the switch operating toggle 20, whereby to close the switch whenever the closing solenoid 34 is energized. A separate source of power, as the battery 36, is herein shown for energizing the closing coil circuit 32, but other means may be employed if desired.

A manually operable disconnecting switch 38 is provided in the closing coil circuit whereby the switch closing means may be disabled in event that work must be done on the faulty section. Otherwise, upon removal of the short circuit, the full line potential will be immediately impressed on the section and injury to the workman may result.

The energization of the closing coil 34 is governed by means with which this invention is more particularly concerned, which means is controlled by the conditions prevailing in the sections controlled by the switch, as sections a and b, Fig. 2. Said means include a transformer core 40 having an energizing primary coil or winding 42 on one leg and a second and similar coil or winding 44 on a similar and oppositely disposed leg thereof. Any usual transformer construction can be employed, however, so that the coils 42 and 44 are inductively connected. One terminal of coil 42 is connected electrically with the line conductor of section b by means of a conductor 46 and the similar terminal of coil 44 is likewise connected by conductor 48 to the line conductor of section a. The remaining terminals of said coils 42 and 44 are connected through conductors 50 and 52 and the current coils 54 and 56 respectively of overload or fault-responsive relays 58 and 60 to ground. Said overload relays are provided with pairs of spaced contacts 62 and 64 which are adapted to be connected in the parallel conductors 63 and 65, which comprise one side of the closing coil circuit 37, and said contacts are adapted normally to be bridged by the movable contact members 66 and 68 of their respective relays.

Potential responsive relays 70 and 72 are provided which are energized from sections a and b respectively. As herein shown, taps 73 are taken off the windings 42 and 44 adjacent the grounded ends thereof whereby to obtain a low voltage supply for the coils 74 and 75 of said relays which is approximately proportional to the voltage impressed on coils 44 and 42 by the line sections a and b. Said relays 70 and 72 are provided with movable contact members 76 and 78 which are adapted, when normal potential exists on their respective sections, to bridge the pairs of spaced normally-open contact members 80 and 82, which latter contact members are connected in series with the contacts 64 and 62 respectively in the parallel conductors of the closing coil circuit 37. It will be evident that upon completing the circuit through contacts 64 and 76 in conductor 65, or the similar contacts 62 and 78 in the conductor 63, the closing coil 34 will be energized from the auxiliary source 36 to close the switch 18 and connect the sections a and b.

The section switch 18 is provided with an auxiliary switch 84 which is arranged to open and close the closing coil circuit 37 in response to closing and opening movements of the switch. Suitable retarding means may be provided for such auxiliary switch whereby the closing coil circuit will be maintained closed for a sufficient interval of time during the closing movement of the switch to insure proper latching-in of the switch, as is common practice.

Assuming both sections a and b, Fig. 2, to be dead, the switch 18 will be open and the auxiliary switch 84 will be closed. The contacts of potential relays 70 and 72 will be open and the contacts of the overload or fault-responsive relays 60 and 58 will be closed. If no fault or overload condition exists on either section and the interrupters 12 are closed to energize section a, the transformer winding 44 associated with section a will be energized and potential will be impressed on the winding 74 of relay 70 and the movable contact member 76 will be attracted toward a position to bridge the contacts 80 thereof and complete the closing coil circuit 37 of the section switch. Some time-consuming means are provided, as the dashpots 86, which are associated with relays 70 and 72, whereby to delay the completion of the closing coil circuit for so long as necessary to permit the overload-responsive relay 60 to operate and disable the closing coil circuit 37 if an overload condition should exist on section a. Said dashpots can be provided with vent openings 87 which operate to disable the delaying means just before the contacts engage whereby to permit a final quick engagement of the contact members. Since no overload condition exists on section a, relay 60 will not operate and upon closing of the contacts 76 and 80 of relay 70, the switch 18 will close and energize section b.

Assuming that a fault, as a ground, exists at x in section b, a short circuit path now exists from the fault x to the ground. The winding 42 associated with section b thus constitutes the short circuited secondary of a transformer, the primary winding 44 of which is energized from section a. Under these conditions wherein the winding 42 is short circuited, or at least shunted by a low resistance path through the short circuit bridge above recited, a relatively high current will be established in winding 42 from energy supplied through winding 44 due to transformer action in core 40. If section a be energized under these conditions, the current-responsive setting of the movable contact member 76 of relay 70 is such that said member 76 will move toward a position to close the circuit 37 through the closing coil as before, but before the dashpot 86 has allowed relay 70 thus to operate the overload current flowing in winding 44, which now constitutes the primary of a transformer having its secondary 42 short circuited, will cause the instantaneous overload relay 60 to operate and move its bridging member 68 out of engagement with contacts 64, thus to disable the closing coil circuit 37 and prevent the closure of the switch 16.

For so long as the fault x exists on section b, the overload current will continue to hold the relay 60 in position to prevent closure of the section switch. If, however, the fault is removed the abnormal current induced in winding 42 by transformer action will cease; likewise, the current in winding 44 will assume a normal value which is insufficient to operate relay 60 and the armature 68 thereof will consequently drop and complete the closing coil circuit 37 and thus automatically close the section switch 16. Since the relay 70 will maintain its contacts closed during the existenc of the short circuit condition in section b, the closing of contacts 64 and 68 of relay 60 will immediately close the switch 16. For this reason, it is desirable, in some instances, to be able to prevent the automatic closing of the switch 16, and the manually operable switch 38 is provided for this purpose.

It will be evident that the system will operate equally well if the section b is the first to be energized. Moreover, if it should so happen that sections e, f, Fig. 1, or any other sections which should happen to be in the electrical middle of the ring feeder were energized simultaneously, since normal conditions must prevail in all the sections in this case, the overload relays 60 and 58 will remain closed and upon the closing of either or both of the potential relays 70 and 72 the section switch 16 will close and connect the sections.

It will be evident from the above description that the switches 16 of the system will close in succession to connect the several sections under normal conditions; that, if a fault exists in any section, the switches 16 at the ends of the faulty section will be held open for so long as the fault exists, in readiness immediately and automatically to restore the service on the faulty section upon resumption of normal conditions therein; and that this is accomplished in the absence of any positive electrical connection between the energized sections and the de-energized section during the existence of a fault therein.

The choice and arrangement of the apparatus may be greatly varied without departing from the scope of the invention.

I claim:

1. In a distribution system, the combination of two feeder sections, a switch for connecting said sections, means to effect the timedelayed opening of said switch upon reduction of potential in said sections, means for controlling the closing of said switch including a winding associated with each section and energized by the potential thereof, said windings being inductively related, means associated with each of said windings responsive to currents therein to disable said switch closing means when an overload condition prevails in a section, and means connected with each of said sections responsive to potential conditions therein to prevent the operation of said switch closing means except when normal potential prevails in said sections.

2. In a distribution system, the combination of two feeder sections, a switch for connecting said sections, means controlling the closing of the switch including a winding associated with each section, said windings being inductively related, and switch closing means including relays energized by and responsive to current and potential conditions in each and also both of said windings to close the switch only when a normal current flows in either or both of said windings and also when a normal potential exists in said sections.

3. In a distribution system, the combination of two feeder sections, a switch for connecting said sections, means controlling the closing of the switch including a winding associated with each section, said windings being inductively related, and switch closing means including relays responsive to potential conditions of the sections, and other relays responsive to current conditions in said windings, said current relays preventing the effective closing action of said potential relays when an abnormal condition occurs in said sections.

4. In a distribution system, the combination of two feeder sections, a switch for connecting said sections, means controlling the closing of the switch including a winding associated with each section, said windings being inductively related, a potential coil responsive to the potential of a section for effecting the closing operation of said closing means, and a current coil responsive to an abnormal current in one of said inductively-connected windings when one of the sections is abnormal for preventing effective operation of said potential coil.

5. An electric distribution system having two sections, a switch for connecting said sections, and means controlling the closing of the switch including a winding associated with each section and energized by the potential thereof, said windings being inductively related, and switch closing means responsive to current conditions in each and also both of said windings arranged to operate to close the switch when a normal current flows in either and also both of said windings, each of said windings, when it is close-circuited, and the other winding is energized at normal potential adapted by the said inductive relation of the windings to cause an abnormal current to flow in said other normally-energized winding, and said switch-closing means being influenced by said abnormal current to leave the switch open.

6. An electric distribution system having two sections, a switch for connecting said sections, electrically-operated closing means for said switch, and means controlling the closing of said switch including a winding associated with each section and energized by the potential thereof, said windings being inductively related, means responsive to overload current flowing in either of said windings to disable said switch closing means, and means responsive to potential in said sections arranged to disable said closing means whenever the potential in either section is less than normal.

7. In a distribution system, the combination of two electrically independent feeder sections, a switch for electrically connecting said sections together, a winding associated with each of said sections and separately energized by the potential thereof, said windings being inductively related, a closing coil for said switch, a source of power for energizing said closing coil, and means controlling the energization of said coil including a potential responsive relay having normally open contacts that are included in said closing coil circuit, a second relay responsive to abnormal current having normally closed contacts which are included in said closing coil circuit, a winding associated with each section and separately energized by the potential thereof, one of which windings is adapted to energize said current responsive relay, and means inductively connecting said windings whereby upon energization of one section an overload condition in either section will actuate said current responsive relay to open its contacts and prevent energization of said closing coil.

8. An electric distribution system having two electrically independent feeder sections one of which is connected with a source of electric power, a switch for connecting said sections, electrically-actuated closing means for said switch, a source of power for said closing means, a potential responsive relay having normally open contacts included in the circuit of said closing means and having its winding energized from said energized section, a current responsive relay having normally closed contact members included in the circuit of said closing means and adapted to open its contacts upon occurrence of overload, a winding in series with the winding of said current responsive relay associated with and energized by the potential of said energized section, and a second winding associated with said other section and inductively related to the winding of said energized section.

9. An electric distribution system having two electrically independent feeder sections one of which is connected with a source of electric power, a switch for connecting said sections, electrically-actuated closing means for said switch, a source of power for said closing means, a potential responsive relay having normally open contacts included in the circuit of said closing means and having its winding energized from said energized section, a current responsive relay having normally closed contact members including in the circuit of said closing means and adapted to open its contact upon occurrence of overload, a winding in series with the winding of said current responsive relay associated with and energized by the potential of said energized section, and a second winding associated with said other section and inductively related to the winding of said energized section, the winding of said other section when it is close-circuited adapted by its inductive relation with the winding of said energized section to cause an abnormal current to flow in the winding of said energized section and consequently in the winding of said current responsive relay, whereby to open its contacts and disable said closing means.

10. In a distribution system, the combination of two feeder sections, a switch for connecting said sections, means controlling the closing of the switch including a winding associated with each section and energized by the potential thereof, said windings being inductively related, and switch closing means including a current responsive relay having its current coil energized by the current flowing in one of said windings and arranged to disable said closing means when an abnormal current condition prevails in both sections and also including a potential responsive relay having its potential coil energized by the potential in the section and arranged to effect the closing of the switch only when normal potential prevails on its section.

11. An electrical distribution system having two sections, a switch for connecting said sections, electrically-actuated closing means for the switch, means for controlling the energization of said closing means including a winding associated with each section and energized by the potential thereof, said windings being inductively related, current responsive means associated with each section and energized by the current flowing in the winding of its section, potential responsive means associated with each section energized by the potential thereof, said current and potential responsive means of each section being arranged to control the energization of said switch closing means in response to current and voltage conditions prevailing in said inductively-related windings, whereby to permit the closing of the switch only when a normal current is flowing in each section and a normal potential obtains therein.

12. In an electric distribution system, the combination of two feeder sections, a switch for connecting said sections, electrically-actuated closing means for said switch, and means influenced by electrical conditions prevailing in said sections for controlling the closing of the switch, said latter means including current and potential responsive relays associated with each section and an energizing winding for said relays associated with each section and separably energized by the potential thereof, said windings being inductively related whereby the relays of one section are rendered responsive to electrical conditions prevailing in the other section.

In testimony whereof, I have signed my name to this specification.

TALMA T. GREENWOOD.